United States Patent
Ragan, Jr. et al.

(10) Patent No.: US 9,176,617 B2
(45) Date of Patent: Nov. 3, 2015

(54) PHYSICAL PRESENCE OF A VIRTUAL BUTTON ON A TOUCH SCREEN OF AN ELECTRONIC DEVICE

(71) Applicant: Lenovo Enterprise Solutions (Singapore) Pte. Ltd., Singapore (SG)

(72) Inventors: Richard W. Ragan, Jr., Round Rock, TX (US); Edgar Tsai, Taipei (TW); Yue Yuan, Shanghai (CN)

(73) Assignee: LENOVO ENTERPRISE SOLUTIONS (SINGAPORE) PTE. LTD., Singapore (SG)

( * ) Notice: Subject to any disclaimer, the term of this patent is extended or adjusted under 35 U.S.C. 154(b) by 0 days.

(21) Appl. No.: 14/180,587

(22) Filed: Feb. 14, 2014

(65) Prior Publication Data

US 2015/0234506 A1     Aug. 20, 2015

(51) Int. Cl.
G09G 5/00     (2006.01)
G06F 3/041     (2006.01)

(52) U.S. Cl.
CPC ..................... *G06F 3/0412* (2013.01)

(58) Field of Classification Search
CPC ............ G06F 3/04886; G06F 3/04883; G06F 3/0238; G06F 3/0412
USPC .................. 345/173–178; 715/773
See application file for complete search history.

(56) References Cited

U.S. PATENT DOCUMENTS

| | | | |
|---|---|---|---|
| 7,352,356 B2 * | 4/2008 | Roberts et al. | 345/156 |
| 7,403,191 B2 | 7/2008 | Sinclair | |
| 7,864,161 B2 | 1/2011 | Hollemans et al. | |
| 8,203,537 B2 | 6/2012 | Tanabe et al. | |
| 8,232,976 B2 | 7/2012 | Yun et al. | |
| 8,368,566 B2 | 2/2013 | Higa | |
| 8,593,409 B1 * | 11/2013 | Heubel et al. | 345/173 |
| 2009/0132093 A1 * | 5/2009 | Arneson et al. | 700/282 |

(Continued)

OTHER PUBLICATIONS

Business Insider, Tactus Technology Tactile Touchscreen, "This Insane Technolgy That Makes Buttons Appear On A Flat Smartphone Screen is Pretty Close to Magic", Jillian D'onfro, Copyright © 2014 Business Insider, Inc., <http://www.businessinsider.com/tactus-technology-tactile-touchscreen-2014-1?nr_email_referer=1&utm_source=Triggermail&utm_medium=email&utm_term=Business%20Insider%20Select&utm_campaign=Bl%20Select%20%28Wednesday%20Friday%29%, Sep. 1, 2014.

(Continued)

*Primary Examiner* — Jennifer Nguyen
(74) *Attorney, Agent, or Firm* — Katherine S. Brown; Andrew M. Calderon; Roberts Mlotkowski Safran & Cole, P.C.

(57) ABSTRACT

An apparatus providing physical presence of a virtual button on a touch screen of an electronic device. The apparatus comprises two layers. The bottom layer is a set of channels that form a matrix along x and y axes. The top layer consists of a matrix of small transparent columns. When the user interface displays an image, such as a pushbutton, the corresponding x and y coordinates that are mapped to the location of the pushbutton on the screen are inflated. The change in volume forces a subset of columns upward in the direction orthogonal to the plane of the screen. When at least one transparent column is raised, the image of the virtual button displayed on the screen takes on a physical presence when the surface of a display screen becomes raised in order to produce a sensation of touch as a finger moves across the surface.

15 Claims, 3 Drawing Sheets

(56) References Cited

U.S. PATENT DOCUMENTS

| | | |
|---|---|---|
| 2011/0157080 A1 | 6/2011 | Ciesla et al. |
| 2011/0216013 A1 | 9/2011 | Siotis |
| 2011/0304550 A1 | 12/2011 | Jolliff et al. |
| 2012/0105333 A1 | 5/2012 | Maschmeyer et al. |
| 2012/0280920 A1 | 11/2012 | Jackson et al. |
| 2013/0155020 A1 | 6/2013 | Heubel et al. |
| 2013/0181946 A1 | 7/2013 | Lee |
| 2015/0077398 A1* | 3/2015 | Yairi et al. .................... 345/175 |

OTHER PUBLICATIONS

IBM, "Touch: You will be able to touch through your phone", The IBM 5 in 5, provided in main idea of disclosure on Nov. 21, 2012, <http://www.ibm.com/smarterplanet/us/en/ibm_predictions_for_future/ideas/index.html>.

"Touch Meets Texture . . . Electronically with TeslaTouch! by Adam Goswick", DizTech vol. 9, provided in main idea of disclosure on Nov. 21, 2012, <http://dizfanatic.com/diztech009.aspx>.

"Tactus morphing touchscreen keyboard hands-on (with video)", provided in main idea of disclosure on Nov. 21, 2012, <http://cn.engadget.com/2013/01/08/tactus-morphing-touchscreen-keyboard-hands-on-with-video/>.

Office Action for related U.S. Appl. No. 14/316,834, dated Jul. 30, 2015, 10 pages.

* cited by examiner

PHYSICAL PRESENCE OF A VIRTUAL BUTTON ON A TOUCH SCREEN OF AN ELECTRONIC DEVICE

FIELD OF THE INVENTION

The present invention relates generally to user interfaces of electronic devices, and more particularly to physical presence of a virtual button on a touch screen of an electronic device.

BACKGROUND

Touch screens have become pervasive in modern electronic devices. One reason for the growing popularity is the ability for the software to generate virtual controls, such as push buttons, menu icons, and sliders. Rather than creating costly physical buttons that may wear out, hardware manufacturers can create virtual buttons on the touch screens. Therefore, interfaces of electronic devices include many virtual rather than physical buttons. These virtual buttons are found on electronic devices as diverse as smart phones and dashboards in automobiles. A user interacts with computer-generated virtual buttons on a flat screen, on which the virtual buttons have no actual presence in the third dimension. The virtual buttons have length and width, but no actual depth.

User-interface designers often use shading to indicate the shadow of a virtual button that is tappable. The user learns to interact with the virtual buttons and panels. If the user interface is internally consistent, the location of each of the virtual push buttons is consistent and the user can tap the spot without having to look directly for its exact location. At this point, the body's proprioceptive sensation, such as the position of the hand using a mouse or the position of the finger tapping a push button on a smart phone, is so well learned that the user avoids looking at the target or consciously positioning the cursor. Once this has happened, the user is said to have developed a feel for the user interface.

Touch screens have an advantage that they can act as both a display showing the user interface and a control allowing the user interface to be manipulated. Prior to touch screens, a display was a non-interactive monitor and a control was an input device such as a keyboard. A disadvantage of the touch screens is that their surfaces are perfectly flat and they furnish no tactile feedback. The traditional physical controls, such as a piano keyboard or the different shapes of the physical knobs of a car radio, offer the sensation of a three dimensional surface through user's touch. The user's fingers sense when they are touching the three-dimensional volume control and the tuning knob, or pressing a key on the keyboard. For example, without a traditional keyboard, the user must use their eyes—they will not be able to use their sense of touch on a flat screen, and as a result, they must redirect their attention from the road or from the music sheet while they use their eyes to scan the surface of the radio or keyboard. The absence of tactile feedback makes the user spend more time looking at the controls rather than focusing on their main task, such as driving the car or reading the music sheet.

SUMMARY

Embodiments of the present invention provide an apparatus providing physical presence of a virtual button on a touch screen of an electronic device. The apparatus comprises a first layer atop a plane of the touch screen. The first layer comprises a grid of first tubular channels and second tubular channels. The first tubular channels are substantially orthogonal to the second tubular channels. The apparatus further comprises a second layer atop the first layer, and the second layer comprises solid columns. The solid columns are positioned at intersections of the first tubular channels and the second tubular channels. Respective ones of the first tubular channels and respective ones of the second tubular channels are capable of increasing dimensions in a direction substantially orthogonal to the plane. When at least one subset of the first tubular channels and at least one subset of the second tubular channels increase the dimensions in the direction substantially orthogonal to the plane, at least one subset of the solid columns is raised in a direction substantially orthogonal to the plane so as to form the physical presence of the virtual button.

DETAILED DESCRIPTION

Figure 1:
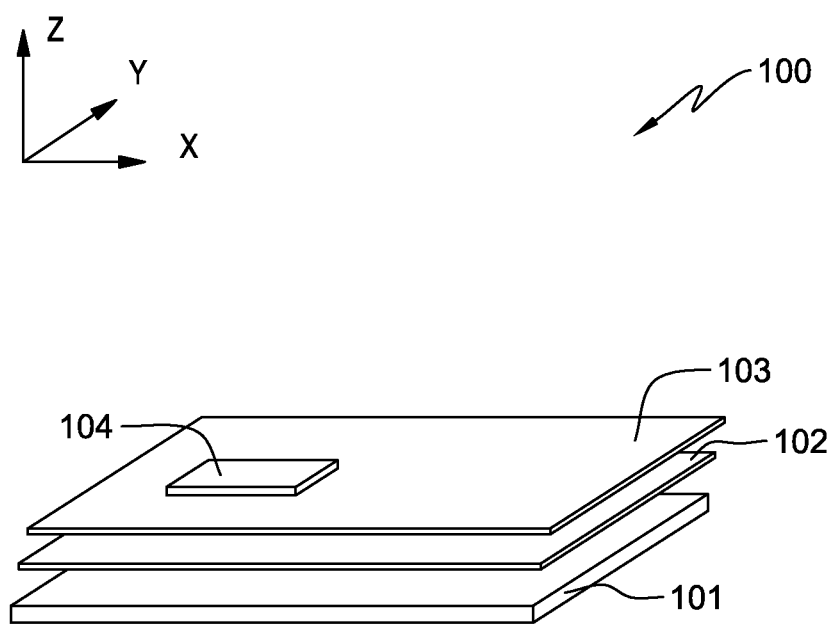
FIG. 1 shows a diagram illustrating layers of an apparatus for physical presence of virtual buttons on a touch screen of an electronic device, in accordance with one embodiment of the present invention.

The present invention is described in detail in the following embodiments with reference to the figures. The foregoing description of various embodiments of the present invention has been presented for purposes of illustration and description. It is neither intended to be exhaustive nor to limit the invention to the precise form disclosed. Many modifications and variations are possible. Such modifications and variations that may be apparent to a person skilled in the art of the invention are intended to be included within the scope of the invention as defined by the accompanying claims.

It is to be understood that the disclosed embodiments are merely illustrative of the claimed structures and methods that may be embodied in various forms. In addition, each of the examples given in connection with the various embodiments is intended to be illustrative, and not restrictive. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the methods and structures of the present disclosure.

An approach disclosed in embodiments of the present invention provides an apparatus whereby the surface of a display screen becomes raised in order to produce a sensation of touch as the finger moves across the surface. The central idea is a touch screen panel composed of thousands of transparent rectangles that rise and fall to give a physical dimension to the user interface objects. The physical layer underneath the rectangular plastic matrixes is controlled by software.

Using an example of a console in an automobile, the touch screen console may show different modes: the radio, the GPS, the thermostat, etc. When the radio mode is activated, a touch screen layout with volume control, radio station preset, seek, and scan buttons may appear. These buttons will be raised to represent the controls encountered during the radio mode. When the user switches to the GPS mode, the touch screen will change to the three-dimensional controls needed for navigation, including zoom in and out on the map, select favorite locations, etc. The plastic matrix composing the surface would raise up giving depth to the zoom in and out controls. If the console switches to the thermostat, then the surface will reset to the new set of virtual buttons such as the fan switch and the thermostat knob. When power is turned off, all physical buttons on the touch screen panel will disappear and the console becomes flat. The matrixes of raise-able transparent plastic rectangles snap back to form a flat surface.

The present invention presents a method to correct the touch screen's shortcoming and the method allows the surface of the screen to dynamically rise or fall. The area of the screen where the tuning knob is drawn has a raised surface that can be detected by the user's finger. For example, consider an 8"×8" touch screen in an automobile. On the left side of the screen is a virtual button drawn by the software, and the virtual button represents the control for the volume of music. If the volume button is 1"×1", then the touch screen will have a raised surface that is 1"×1"×¼" under the rendered button. Now that there is a section of the screen that is raised one fourth of an inch above the rest of the screen, the user can slide their finger across the touch screen to locate the button more easily.

Naturally, the more raised the screen, the easier it is for the user to feel the difference with their fingers. The more the raised area is shaped like the control (e.g., round raised surface for circular controls on the touch screen), the easier the user can identify the type of control. Ultimately, the raised surface of the touch screen will mimic the original physical object—an actual keyboard made of plastic with raised surfaces representing the keys. On a touch screen, the English QWERTY keyboard will have 26 raised surfaces to represent the 26 letters of the alphabet. The Enter button will be twice as long, giving the user a larger surface area to touch. The surface of the touch screen has now transformed from a perfectly smooth and flat surface to that of a raised surface that completely matches the original.

Embodiments of the present invention will now be described in detail with reference to the accompanying drawings. In all drawings, a Cartesian coordinate system is used to indicate three-dimensional directions (X-direction, Y-direction, and Z-direction).

FIG. 1 shows a diagram illustrating layers of apparatus 100 for physical presence of virtual buttons on a touch screen of an electronic device, in accordance with one embodiment of the present invention. Apparatus 100 comprises layer 101 which is an electronic device, layer 102 which is a touch screen of the electronic device, and layer 103 which is atop the touch screen. Layer 103 includes, in the X-Y plane, a grid of m×n matrixes or channels which are filled with a fluid and are controlled by the software in layer 101. When one or more selected subsets of the matrixes or the channels are forced up along the +Z direction, one or more areas are raised in the +Z direction. FIG. 1 shows raised area 104. Layer 101, or the electronic device, is a smartphone, a radio set, a GPS set, a thermostat, or any electronic device which has a touch screen display.

Figure 2:
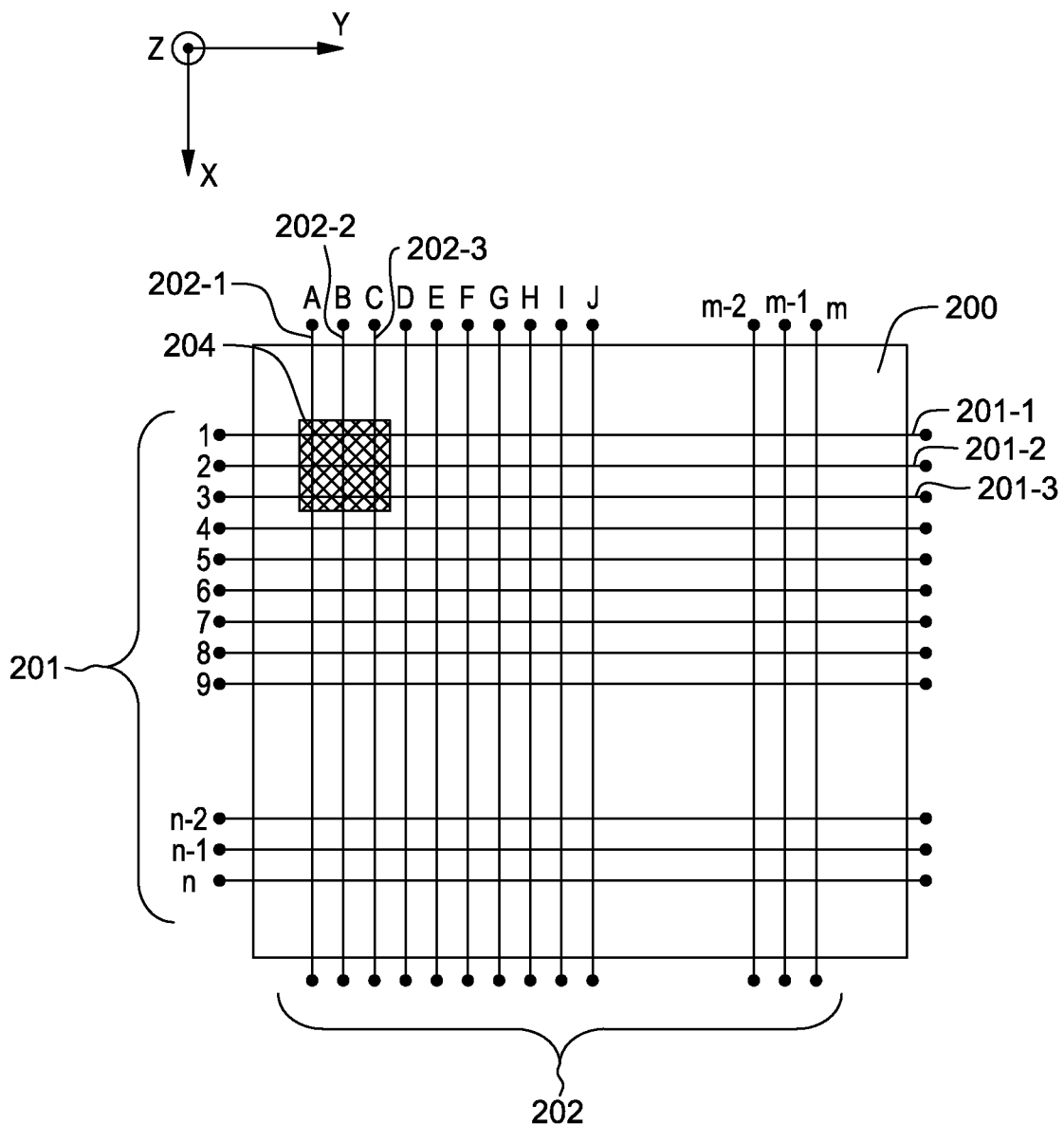
FIG. 2 show a diagram illustrating a grid of m×n overlapping channels in a layer atop a touch screen of an electronic device, in accordance with one embodiment of the present invention.

FIG. 2 shows a diagram illustrating a grid of m×n overlapping channels in layer 103 atop a touch screen (layer 102) of electronic device 100, in accordance with one embodiment of the present invention. In an example of layer 103, m channels 202 and n channels 201 form a m×n grid on the top (the X-Y plane) of substrate 200. Channels 202 and channels 201 form a grid with a resolution of m×n. For example, the grid can be overlapping channels 202 and 201 with a resolution of 800× 600. A transparent fluid, such as water, air, and oil, can be pushed through channels 202 and 201. When the transparent fluid is pushed through channels 202 and 201, the selected subset of columns (which are atop of channels 202 and 201) are forced up, giving the raised physical pushbuttons. As an example, FIG. 2 shows raised area 204. Area 204 is raised up when the transparent fluid is pushed into some channels of channels 202 and 201, In this example, channels A, B, C of channels 202 (denoted by numerals 202-1, 202-2, and 202-3, respectively) are raised; channel 1, 2, and 3 of channels 201 (denoted by numerals 201-1, 201-2, and 201-3, respectively) are raised.

Figure 3:
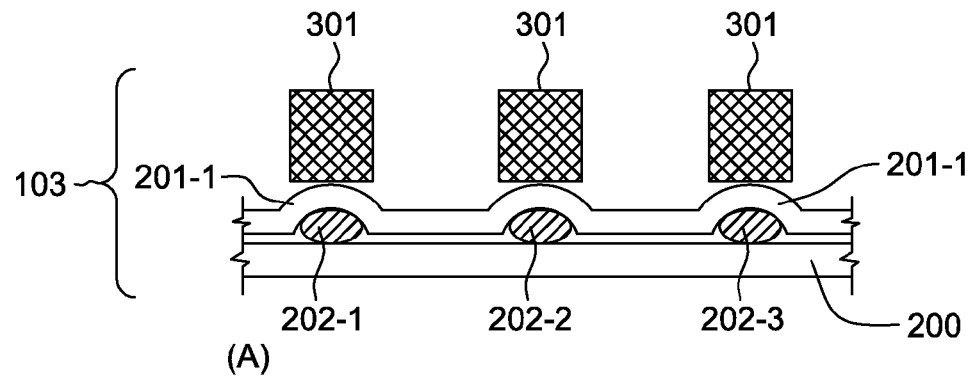
FIG. 3 shows a diagram illustrating a cross section of a raised area shown in FIG. 2, in accordance with one embodiment of the present invention.
Figure 3:
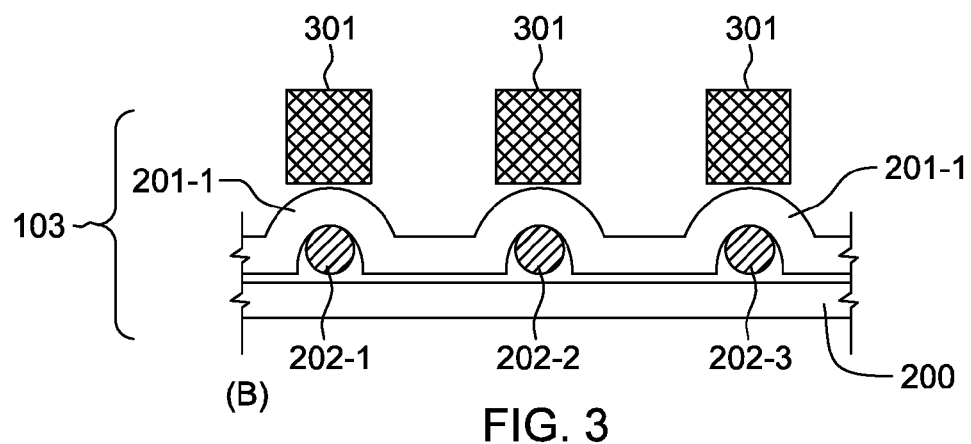

FIG. 3 shows a diagram illustrating a cross section of raised area 204 shown in FIG. 2, in accordance with one embodiment of the present invention. FIG. 3(A) shows the cross section of raised area 204 under the condition where channels 202-1, 202-2, 202-3, 201-1, 201-2, and 201-3 are not inflated. In the sectional drawing presented in FIG. 3, cross sections in the transverse direction of channels 202-1, 202-2, and 202-3 are shown, and a cross section in the axial direction of channel 201-1 is shown. FIG. 3 shows an example of layer 103 shown in FIG. 1.

Referring to FIG. 3, columns 301 are at intersections between channels 202 (e.g., 202-1, 202-2, and 202-3 shown in FIG. 3) and channels 301 (e.g., 201-1 shown in FIG. 3). Columns 301 may be rectangular, cylindrical, or other shape known to be used to make a column. Columns 301 are plastic or glass columns, or any other transparent material. Channels 202 (e.g., 202-1, 202-2, and 202-3 shown in FIG. 3) and channels 201 (e.g., 201-1 shown in FIG. 3) are flexible tubing that swells when the transparent fluid is pumped into the channels, and deflates when the pumps for the channels are turned off. As the channels swell, they push columns 301 upward in the Z-direction. The flexible channels that swell with the transparent fluid are controlled by pumps surrounding substrate 200 that raises columns 301. There are many other ways of pushing columns 301 up using heating a fluid, such as with a thermometer, electronics and magnets with solenoids, etc. As shown in FIG. 3(A), when the transparent fluid, such as water, air, and oil, is not filled in channels 202-1, 202-2, 202-3, 201-1, 201-2, and 201-3, the channels are deflated; therefore, columns 301 are not pushed up in the Z-direction. As shown in FIG. 3(B), when the transparent fluid, such as water, air, and oil, is filled in channels 202-1, 202-2, 202-3, 201-1, 201-2, and 201-3, the channels are inflated; as a result of inflation of the channels, columns 301 are pushed up in the Z-direction. The rising of columns 301 forms raised area 204 shown in FIG. 2.

The selection of the transparent fluid in the matrixes or channels is driven by many factors, such as the nature of the activation, the economic factors, and ecological factors. For example, pumps are more expensive than a single heat source for making the transparent fluid increase in volume. If the transparent fluid is water or oil, then the mechanism that pushes the liquid can be controlled by m and n (e.g., 800 and 600) switches at the X-Y plane shown in the figures. If the resolution of layer 103 is 800×600, 1400 switches are needed; this number of switches is very economical. Compared to electronic valves and transistors, physical valves are prone to failure but they are cheaper. In an example of using wax (as used in modern thermometers), the material expands when heated. A heat source can be positioned either at every point on the grid (e.g., 240,000) or along the X and Y axis (e.g., 1400) if the expansion can be tuned well enough for the union of the temperatures to force columns up. The heat source can be something as cheap as a modern LED (light emitting diode) or piezoelectric sparks generated by bending crystals known to have a piezoelectric property, such as quartz crystals.

Having described preferred embodiments of a tunable semiconductor device (which are intended to be illustrative and not limiting), it is noted that modifications and variations may be made by persons skilled in the art in light of the above teachings. It is therefore to be understood that changes may be made in the particular embodiments disclosed which are within the scope of the invention as outlined by the appended claims.

What is claimed is:

1. An apparatus for physical presence of a virtual control button on a touch screen of an electronic device, comprising:
    a first layer atop a plane of the touch screen, the first layer comprising a grid of first tubular channels and second tubular channels, the first tubular channels substantially orthogonal to the second tubular channels;
    a second layer atop the first layer, the second layer comprising solid columns, the solid columns positioned at intersections of the first tubular channels and the second tubular channels;
    wherein respective ones of the first tubular channels and respective ones of the second tubular channels are capable of increasing dimensions in a direction substantially orthogonal to the plane;
    wherein at least one subset of the solid columns is raised in a direction substantially orthogonal to the plane so as to form the physical presence of the virtual control button when at least one subset of the first tubular channels and at least one subset of the second tubular channels increase the dimensions in the direction substantially orthogonal to the plane; and
    wherein the electronic device comprises a display screen configured to provide a visual user interface including the virtual control button.

2. The apparatus of claim 1, wherein the solid columns are rectangular columns.

3. The apparatus of claim 1, wherein the solid columns are transparent.

4. The apparatus of claim 1, wherein the dimensions are increased by filling a fluid into the respective ones of the first tubular channels and the respective ones of the second tubular channels.

5. The apparatus of claim 4, wherein the fluid is controlled by valves, the valves are connected to the respective ones of the first tubular channels and the respective ones of the second tubular channels, and the valves are controlled by software of the electronic device.

6. The apparatus of claim 4, wherein the fluid is transparent.

7. The apparatus of claim 1, wherein the dimensions are increased by heating, with heat sources, a fluid in the respective ones of the first tubular channels and the respective ones of the second tubular channels.

8. The apparatus of claim 7, wherein the heat sources are positioned at intersections of the first and second channels.

9. The apparatus of claim 7, wherein the heat sources are controlled by software of the electronic device.

10. The apparatus of claim 7, wherein the heat sources are light emitting diodes (LEDs).

11. The apparatus of claim 7, wherein the heat sources are piezoelectric sparks generated by bending crystals that have a piezoelectric property.

12. The apparatus of claim 1, wherein the electronic device comprises a smartphone.

13. The apparatus of claim 1, wherein the electronic device comprises a console display in an automobile.

14. The apparatus of claim 13, wherein the console display includes virtual radio control buttons.

15. The apparatus of claim 14, wherein the virtual radio control buttons include at least one of volume control, radio station preset, seek, and scan virtual control buttons.

* * * * *